(12) United States Patent
Powell et al.

(10) Patent No.: US 12,123,193 B2
(45) Date of Patent: Oct. 22, 2024

(54) CONTINUOUS NONWOVEN POLYESTER FIBER AND FIBERGLASS THREAD HYBRID MAT

(71) Applicant: TAMKO Building Products LLC, Galena, KS (US)

(72) Inventors: James Gregory Powell, Reeds, MO (US); Chris Freeborg, Irving, TX (US); Jonathan Marta, Joplin, MO (US); Kyle Davis, Irving, TX (US)

(73) Assignee: TAMKO Building Products LLC, Galena, KS (US)

( * ) Notice: Subject to any disclaimer, the term of this patent is extended or adjusted under 35 U.S.C. 154(b) by 824 days.

(21) Appl. No.: 16/796,686

(22) Filed: Feb. 20, 2020

(65) Prior Publication Data
US 2020/0263429 A1    Aug. 20, 2020

Related U.S. Application Data (60) Provisional application No. 62/808,059, filed on Feb. 20, 2019.

(51) Int. Cl.
*E04D 1/22* (2006.01)
*D01D 5/08* (2006.01)
(Continued)

(52) U.S. Cl.
CPC .................. *E04D 1/22* (2013.01); *D01D 5/08* (2013.01); *D01F 8/14* (2013.01); *D01F 8/18* (2013.01); *D04H 3/004* (2013.01); *D04H 3/011* (2013.01); *D04H 3/013* (2013.01); *D04H 3/105* (2013.01); *D04H 3/11* (2013.01); *D04H 3/12* (2013.01);
(Continued)

(58) Field of Classification Search
None
See application file for complete search history.

(56) References Cited

U.S. PATENT DOCUMENTS 5,017,426 A  *  5/1991  Greiser .................. D04H 3/004
                                                              442/388
5,047,104 A      9/1991  Preis et al.
(Continued)

FOREIGN PATENT DOCUMENTS

| CA | 2247342 | * | 9/1997 |
|----|---------|---|--------|
| DE | 3226041 | * | 1/1984 |
| WO | 2005/042819 A2 | | 5/2005 |

OTHER PUBLICATIONS

Machine Translation of DE3226041 (Year: 1984).*

(Continued)

*Primary Examiner* — Shawn Mckinnon
(74) *Attorney, Agent, or Firm* — Cochran Freund & Young LLC; William W. Cochran (57) ABSTRACT

Disclosed are methods and devices for forming a combined polyester and fiberglass mat, in which separate polyester and fiberglass layers can be formed or polyester filaments and fiberglass threads can be mixed together by a disperser to form a polyester and fiberglass web. The polyester filaments and the fiberglass threads can be dispersed by separate dispersers on a web forming belt to form separate layers of polyester filaments and fiberglass threads, or can be dispersed by a single disperser to at least, somewhat evenly disperse, the fiberglass threads and polyester filaments.

43 Claims, 5 Drawing Sheets

(51) Int. Cl.
- *D01F 8/14* (2006.01)
- *D01F 8/18* (2006.01)
- *D04H 3/004* (2012.01)
- *D04H 3/011* (2012.01)
- *D04H 3/013* (2012.01)
- *D04H 3/105* (2012.01)
- *D04H 3/11* (2012.01)
- *D04H 3/12* (2006.01)
- *D04H 3/153* (2012.01)
- *D06N 3/00* (2006.01)
- *D06N 5/00* (2006.01)

(52) U.S. Cl.
CPC .......... *D04H 3/153* (2013.01); *D06N 3/0011* (2013.01); *D06N 5/003* (2013.01); *D06N 2201/02* (2013.01); *D06N 2201/082* (2013.01); *D06N 2211/06* (2013.01); *D10B 2505/18* (2013.01)

(56) References Cited

U.S. PATENT DOCUMENTS

| | | | |
|---|---|---|---|
| 5,409,573 A * | 4/1995 | Weeks | B29C 70/28 |
| | | | 162/149 |
| 5,872,067 A * | 2/1999 | Meng | B29C 70/12 |
| | | | 156/60 |
| 5,985,776 A | 11/1999 | Bertrand et al. | |
| 6,235,657 B1 | 5/2001 | Schops et al. | |
| 2006/0228963 A1 | 10/2006 | Souther et al. | |
| 2011/0034100 A1* | 2/2011 | Narayanan | D04H 1/4258 |
| | | | 28/104 |
| 2018/0014678 A1* | 1/2018 | Zafiroglu | B32B 27/36 |

OTHER PUBLICATIONS

International Search Report and Written Opinion, for Application No. PCT/US2020/019120, titled "Continuous Nonwoven Polyester Fiber and Fiberglass Thread Hybrid Mat", mailed Jun. 23, 2020, 29 pages.

* cited by examiner

CONTINUOUS NONWOVEN POLYESTER FIBER AND FIBERGLASS THREAD HYBRID MAT

BACKGROUND

Shingle technology has advanced greatly over the past few decades. Roof shingles provide protection for houses and buildings to prevent leakage of rain water into the interior of the building. Various types of materials have been used to make shingles including asphalt and other materials.

SUMMARY

An embodiment of the present invention may therefore comprise a method of forming a combined continuous synthetic fiber and continuous mineral fiber web comprising: heating a plastic to a liquid state to create liquid plastic; extruding the liquid plastic through a first extruder to create a plurality of first continuous synthetic fiber filaments; drawing the first continuous synthetic fiber filaments through a first vacuum venturi tube; dispersing the first continuous synthetic fiber filaments across a web forming belt using a first disperser to create a first layer of dispersed continuous synthetic fiber filaments; moving the first layer of dispersed continuous synthetic fiber filaments in a predetermined direction on the web forming belt; drawing at least one continuous mineral fiber thread through a second vacuum venturi tube; dispersing the at least one continuous mineral fiber thread on the first layer of dispersed continuous synthetic fiber filaments as the web forming belt moves the first layer of dispersed continuous synthetic fiber filaments in the predetermined direction, using a second disperser, to create a dispersed layer of continuous mineral fiber thread disposed on the first layer of continuous synthetic fiber filaments that is moving in the predetermined direction.

An embodiment of the present invention may further comprise a method of forming a combined synthetic fiber and mineral fiber web comprising: heating a synthetic polymer to a liquid state to create a liquid synthetic polymer; extruding the liquid synthetic polymer through a first extruder to create a plurality of first polymer filaments; drawing the polymer filaments through a vacuum venturi tube; supplying the polymer filaments and at least one mineral fiber thread to a disperser that disperses the polymer filaments and the at least one mineral fiber thread across a web forming belt to create the combined polyester and fiberglass web.

An embodiment of the present invention may further comprise a device for making a combined, non-woven, synthetic fiber and mineral fiber web comprising: a supply of synthetic polymer pellets; a heater that heats the synthetic polymer pellets to a liquid state to create a liquid synthetic polymer; a pump that pumps the liquid synthetic polymer; a first extruder that extrudes the liquid synthetic polymer through a plurality of first openings in a die to form a first plurality of polymer filaments; a first vacuum venturi tube that draws the first plurality of polymer filaments through the first vacuum venturi tube and stretches the polymer filaments; a first disperser that spreads the first plurality of polymer filaments on a web forming belt to form a first layer of polymer filaments; a second vacuum venturi tube that draws at least one mineral thread through the second vacuum venturi tube; a second disperser that disperses the at least one mineral thread on the first layer of polymer filaments as the web forming belt moves the first layer of polymer filaments in a predetermined direction to form a layer of mineral thread disposed on the first layer of polymer filaments.

An embodiment of the present invention may further comprise a device for making a combined, non-woven, polymer filament and mineral thread web comprising: a heater that heats a supply of synthetic polymer to a liquid state; a pump that pumps the liquid synthetic polymer; an extruder that extrudes the liquid synthetic polymer through a plurality of openings to form a plurality of polymer filaments; a vacuum venturi tube that draws the plurality of polymer filaments through the vacuum venturi tube and stretches the plurality of polymer filaments; at least one disperser that disperses at least one mineral thread and the plurality of polymer filaments on a web forming belt.

An embodiment of the present invention may further comprise a method of forming a combined synthetic fiber and mineral fiber web comprising: dispersing first synthetic fiber filaments across a web forming surface using a first disperser to create a first layer of dispersed synthetic fiber filaments; dispersing at least one mineral fiber thread on the first layer of dispersed synthetic fiber filaments, using a second disperser, to create a dispersed layer of mineral fiber thread disposed on the first layer of synthetic fiber filaments; entangling the first layer of dispersed synthetic fiber filaments and the dispersed layer of mineral fiber thread; bonding the entangled, combined synthetic fiber and mineral fiber web to form an entangled synthetic fiber and mineral fiber web.

An embodiment of the present invention may further comprise a method of forming a combined synthetic fiber and mineral fiber web comprising: supplying the polymer filaments and at least one mineral fiber thread to a disperser that disperses the polymer filaments and the at least one mineral fiber thread across a web forming surface; entangling the polymer filaments, the mineral fiber thread dispersed across the web forming surface to form an entangled polymer filament and mineral fiber; bonding the entangled polymer filament and mineral fiber web.

An embodiment of the present invention may further comprise a device for making a combined, non-woven polymer filament and mineral thread web comprising: a first disperser that spreads a first plurality of polymer filaments on a web forming surface to form a first layer of polymer filaments; a second disperser that disperses at least one mineral thread on the first layer of polymer filaments to form a layer of mineral thread disposed on the first layer of polymer filaments; an entangler that entangles the first layer of polymer filaments and the layer of mineral thread; at least one bonding device that bonds the first layer of polymer filaments and the layer of fiberglass thread to form a non-woven polymer filament and mineral thread web.

An embodiment of the present invention may further comprise a device for making a combined, non-woven, polymer filament and mineral thread web comprising: a disperser that disperses at least one continuous mineral thread and a plurality of continuous polymer filaments on a web forming surface; an entangler that entangles the plurality of continuous polymer filaments and the at least one continuous mineral thread; at least one bonding device that bonds the plurality of continuous polymer filaments and the at least one continuous mineral thread to form a non-woven polymer filament and mineral thread web.

An embodiment of the present invention may further comprise a roofing material comprising: a combined, non-woven polymer filament and mineral thread web comprising: a disperser that disperses at least one continuous mineral thread and a plurality of continuous polymer filaments on a web forming surface; an entangler that entangles the plurality of continuous polymer filaments and the at least one continuous mineral thread; at least one bonding device that bonds the plurality of continuous polymer filaments and the at least one continuous mineral thread to form a non-woven polymer filament and mineral thread mat; at least one layer of asphalt adhered to the non-woven polymer filament and mineral thread mat.

An embodiment of the present invention may further comprise a device for making a combined, non-woven, polymer filament and organic yarn thread comprising: a disperser that disperses at least one organic yarn thread and a plurality of continuous polymer filaments on a web forming surface; an entangler that entangles the plurality of continuous polymer filaments and the at least one organic yarn thread; at least one bonding device that bonds the plurality of continuous polymer filaments and the at least one organic yarn thread to form a non-woven polymer filament and organic yarn thread web.

DETAILED DESCRIPTION OF THE EMBODIMENTS

Figure 1:
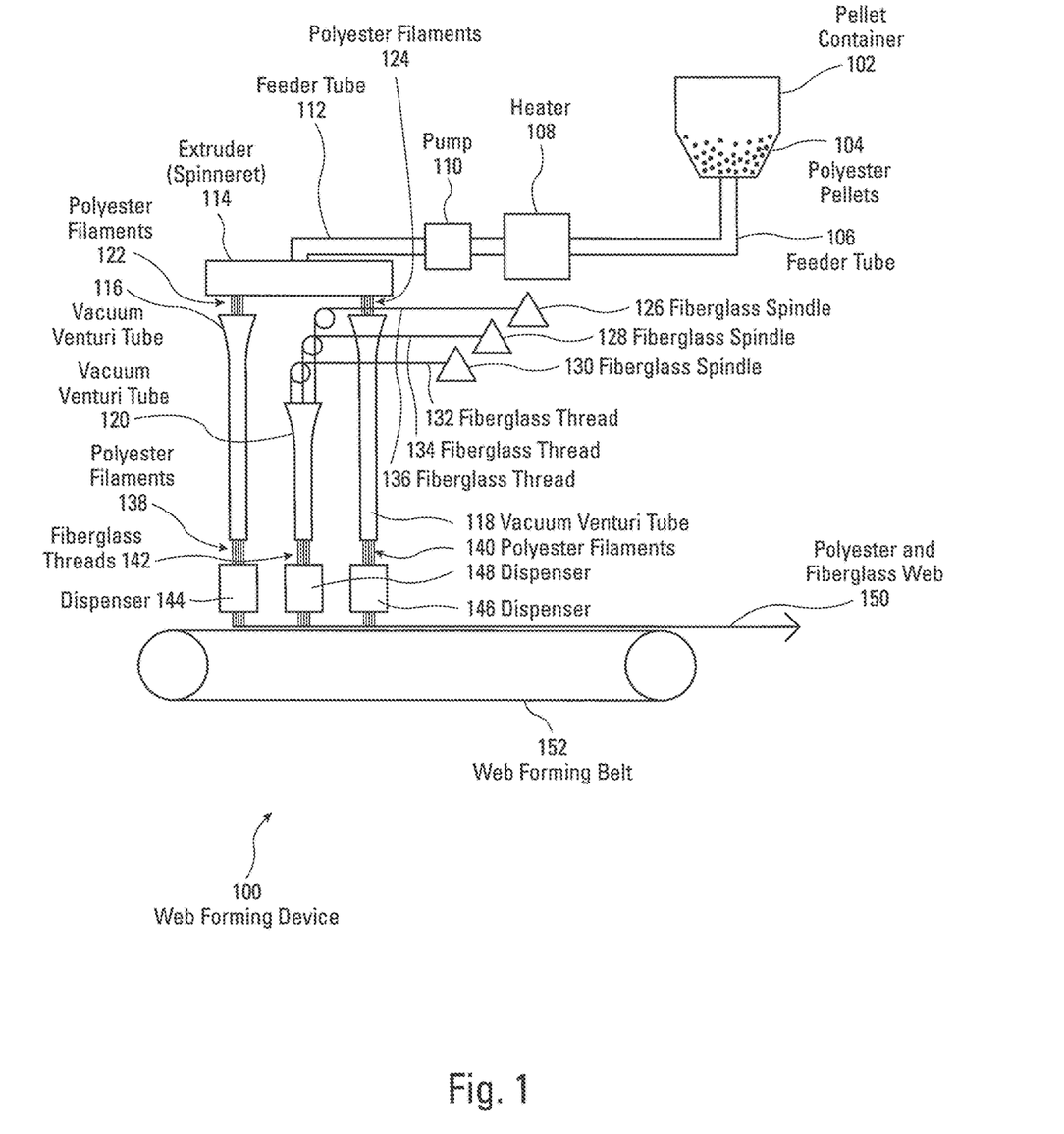
FIG. 1 illustrates a first embodiment of the present invention.

FIG. 1 is a schematic illustration of an embodiment of a process and apparatus for creating a web of synthetic fibers such as polyester filaments and mineral fibers such as fiberglass threads. In the description of the embodiments disclosed herein, various plastics and polymer fibers can be used in place of polyester filaments including polyolefin and polypropylene. The term "polyester filaments" as used herein to describe the invention, should be considered to be one example of the various synthetic fibers and polymer filaments (e.g. fibers) that can be used in accordance with the present invention. The term "polyester mat" as used herein to describe the invention, should be considered to be one example of the various synthetic fibers and polymer filaments or fibers formed into a non-woven web or mat that can be used in accordance with the present invention. Further, the use of the term "fiberglass threads," as used herein, should be considered as one example of a mineral fiber or thread, and any suitable mineral fiber or thread can be used in accordance with the present invention. The web that is formed by entanglement of polymer fibers and mineral fibers can be used as a substrate in various types of roofing materials, including shingles, water-sealing membranes and other materials. Water-sealing membranes can be used on roofs, foundations or under siding on a building to prevent penetration of water and moisture. Typical substrate materials include a mineral fiber such as a fiberglass mat that provides strength and stability to asphalt coated layers that form a shingle or membrane. Strength and stability is provided by the continuous nature of fiberglass threads. Fiberglass mats that are made from cut fiberglass threads do not provide the strength and stability of continuous fiberglass threads. The fiberglass mat also functions as a fire retardant, especially when it is sandwiched between two asphalt layers. Fiberglass mats are also used as substrates for various other types of products. One of the disadvantages of using a fiberglass mat in roofing materials is that impacts, such as impacts by hail on a roof, or other impacts, can weaken the structural integrity of a shingle or waterproof membrane, since the fibers of the non-woven fiberglass mat are very brittle, and can display weakness when the fiberglass mats are constructed of cut fiberglass threads that are only a few inches long, rather than the continuous fiberglass threads. The discontinuous nature of the fiberglass threads makes the substrate weaker. The structural integrity of the roofing material can be weakened sufficiently by impacts and may require replacement of the roofing material.

Synthetic fibers such as polymer filaments can also be formed into a non-woven mat. Non-woven polyester mats can be used as a roofing substrate and are more malleable than fiberglass due to the viscoelastic properties of the polyester filaments comprising the non-woven mat so that the structural integrity of the substrate is not reduced to a great effect as a result of impacts. However, polyester substrates do not provide the fire resistance that fiberglass substrates provide. There are also other problems associated with the use of a non-woven polyester filament mat as a roofing substrate, including shrinkage in the lateral direction of a polyester web moving through a high speed roofing line. As such, non-woven polyester mats have not been used as substrates for roofing materials.

Referring again to FIG. 1, a web forming device 100 is illustrated that comprises one embodiment of the present invention. As illustrated in FIG. 1, a pellet container 102 contains polyester pellets 104, or other pellets of polymer material, that are fed through a feeder tube 106 to a heater 108. Heater 108 heats the polyester pellets to a liquid state. The liquid polyester is then pumped by a pump 110 through a feeder tube 112 to an extruder 114 that is otherwise known as a spinneret. Extruder 114 extrudes continuous liquid polyester through spinneret openings which transitions from a liquid state to a solid state thereby forming continuous polyester filaments 122, 124, which are drawn into vacuum venturi tube 116 and vacuum venturi tube 118. The polyester filaments 122, 124 are stretched in the vacuum venturi tubes 116, 118 to form continuous polyester filaments 138, 140, respectively. The polyester filaments 138, 140 have a very small diameter, on the order of 17 to 19 microns based on a PET density of 1.38 grams per cubic centimeter. Disperser 144 distributes the polyester filaments 138 across the surface of the web forming belt 152 to form a first layer of polyester filaments 138. Disperser 146 disperses polyester filaments 140 across the surface of the web forming belt 152 to form a third layer of the polyester and fiberglass web 150. The dispersers 144, 146 spread the continuous polyester filaments 138 evenly, but in a somewhat random manner on the web forming belt 152. Although these polyester filaments 138, 140 are continuous, breaks and disruptions may occur in the polyester filaments 138, 140 for various reasons, including the fact that the dispersers 144, 146 may break the continuous polyester filaments 138, 140. Occasional breaks in the polyester filaments 138, 140 do not substantially weaken the polyester and fiberglass web 150. Even though the polyester filaments 138, 140 have occasional breaks, for purposes of this disclosure and interpretations of claims herein, these fibers are considered to be "continuous" even if there are occasional breaks in the fiber or disruptions caused by other factors.

The fiberglass threads, illustrated in FIG. 1, are provided on a spindle and have a typical continuous length of 15,000 yards on each spindle. The spun-bonding process of the polyester filaments, which are continuously extruded, result in numerous filaments that are extruded from a spinneret 114, i.e., 116 filaments per spinneret 114. On a typical machine, there may be 128 separate spinnerets. All of these fibers are continuously extruded, resulting in miles of polyester filaments that are delivered to the dispersers 144, 146. Random interruption in the filament formation process between one spinneret and vacuum venture tube may occur from time to time which temporarily disrupts the continuous nature of the filaments from that spinneret depending on the particular day and operating conditions. In other words, the polyester filaments rarely break and, in that regard, are considered to be "continuous." The manner in which the dispersers spread both the fiberglass threads and the polyester filaments provides for a substantially even dispersement of both the polyester filaments and fiberglass threads. However, the random order in which they are spread increases the overall strength of the resulting web. The polyester filaments, because of the random orientation in which they form the resulting web and their viscoelastic properties, can elongate to absorb an impact in all directions without breaking. This greatly enhances the impact resistance. The tensile strength of the fiberglass threads, especially when laid out in the random manner created by the disperser, provides for a very strong web having high tensile strength in all directions. Although the drawings illustrate a process of extruding polyester filaments, the polyester filaments can also be pre-made and supplied to the dispersers to achieve the polyester and fiberglass web having continuous polyester fibers and continuous fiberglass threads.

Some organic fibers can also be used in place of the fiberglass threads. For example, lyocell can be used in place of the fiberglass threads. Lyocell is a form of rayon, which consists of cellulose fiber made from dissolving pulp, such as bleached wood pulp, using dry jet-wet spinning. Lyocell was originally developed in 1972 in North Carolina. Lyocell fibers are composed of cellulose precipitated from an organic solution in which no substitution of the hydroxyl groups takes place and no chemical intermediates are formed. The lyocell fibers are soft, absorbent, very strong, in either wet or dry conditions, and resistant to wrinkles.

As also disclosed in FIG. 1, spindles such as fiberglass spindles 126, 128, 130 dispense mineral fibers such as fiberglass threads 132, 134, 136, respectively. The continuous fiberglass threads 132, 134, 136 are directed into a vacuum venturi tube 120. The continuous fiberglass threads 142 are pulled through the vacuum venturi tube 120 and are directed into disperser 148. Disperser 148 disperses the fiberglass threads over the top of the dispersed polyester filaments 138 that have been dispersed by disperser 144 to form a second layer of the polyester and fiberglass web 150. Disperser 146 disperses polyester filaments 140 over the top of the dispersed fiberglass threads 142. In other words, the fiberglass threads 142 are dispersed by disperser 148 and are sandwiched between polyester filaments 138, dispersed by disperser 144, and polyester filaments 140, dispersed by disperser 146. The polyester and fiberglass web 150 is then moved in the direction of the arrow, illustrated in FIG. 1, to a web finishing process 400, illustrated in FIG. 4. The dispersers 144, 146 and 148, as well as the other dispersers disclosed herein, substantially evenly disperse the polyester filaments and fiberglass threads, on the web forming belt 52 in a random manner. Although the continuous fiberglass threads 132, 134, 136 are referred to as being "continuous," occasional breaks in the fiberglass thread occur as well as disruptions in the fiberglass thread when a new thread is fed from a new spindle. Although these occasional breaks are present, which can occur for various reasons, for purposes of this disclosure, the fiberglass threads 132, 134, 136 are referred to as being continuous, even though occasional breaks and other disruptions may occur. For purposes of interpretation of claims, the term "continuous" should be considered to mean that breaks and other disruptions in either the fiberglass thread or polyester filaments may occur and still be considered to be continuous.

Figure 2A:
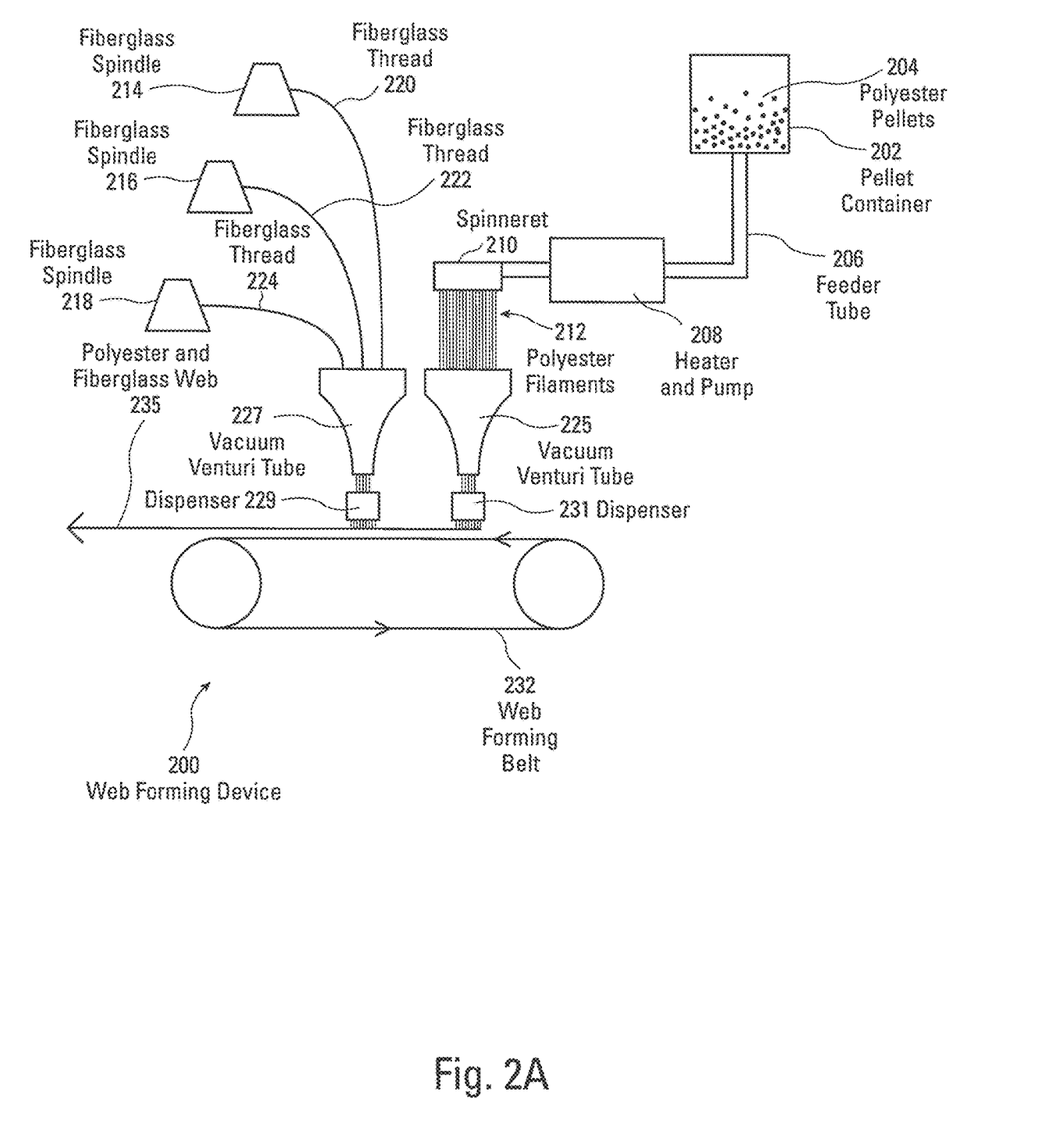
FIG. 2A illustrates an embodiment of a web forming device.

FIG. 2A discloses an embodiment of a web forming device 200. As illustrated in FIG. 2A, polyester pellets 204 are provided in a pellet container 202. Feeder tube 206 connects the pellet container 202 to a heater and pump 208. The heater and pump heat the polyester pellets to a liquid state and pump the liquid polyester into spinneret 210. The spinneret 210 is an extrusion device that extrudes the polyester filaments 212. Vacuum venturi tube 225 draws the polyester filaments 212 through the use of a vacuum and stretches the polyester filaments 212 to give the polyester filaments 212 greater strength.

As also shown in FIG. 2A, fiberglass spindles 214, 216, 218 provide fiberglass threads 220, 222, 224, respectively. The polyester filaments 212 that are drawn through the vacuum venturi tube 225 are dispensed by dispenser 231, which forms a layer of non-woven polyester filaments over the surface of the web forming belt 232 to form a layer of polyester filaments that moves under dispenser 229. The fiberglass threads 220, 222, 224 are drawn into vacuum venturi tube 227 by the vacuum created in the vacuum venturi tube 227. Dispenser 229 dispenses the fiberglass threads 220, 222, 224 over the layer of non-woven polyester filaments as the web forming belt is moving to the left which forms a layer of fiberglass threads over the layer of polyester filaments. In this manner, polyester and fiberglass web 235 is formed, which has a top layer of non-woven fiberglass threads that cover a bottom layer of non-woven polyester filaments.

Figure 2B:
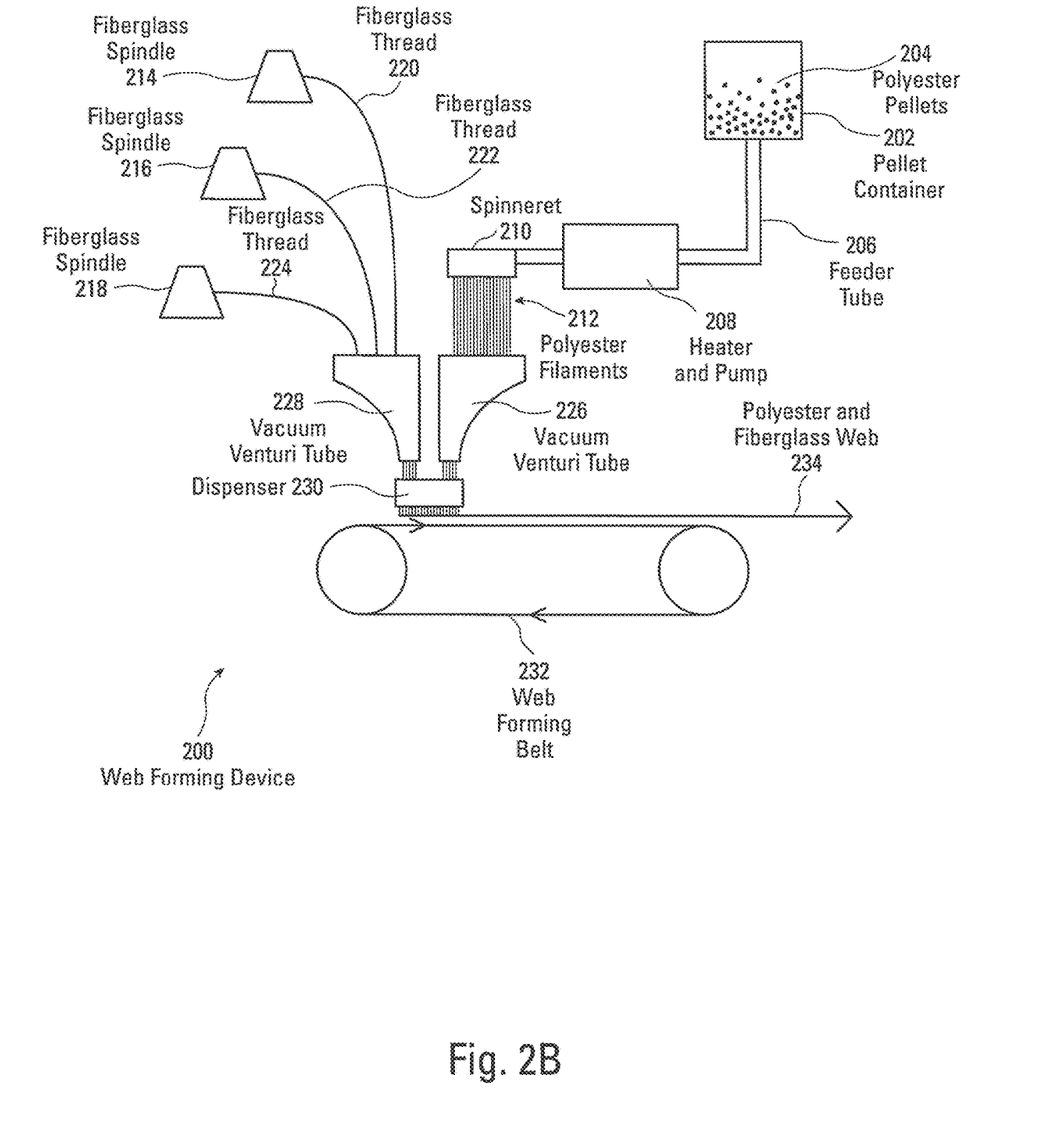
FIG. 2B illustrates a second embodiment of the present invention.

FIG. 2B discloses another alternative embodiment for forming a combined polyester and fiberglass web 234. As illustrated in FIG. 2B, the web forming device 200 feeds one or more fiberglass threads such as fiberglass thread 220, 222 and 224 into a vacuum venturi tube 228. The fiberglass threads are continuous threads that are unwound from spindles, such as fiberglass spindles 214, 216 and 218. Any number of fiberglass threads can be fed through the vacuum venturi tube 228, including just a single thread, two threads or more than three threads, depending upon the amount of fiberglass that is desired in the polyester and fiberglass web 234. At the same time, a vacuum venturi tube 226 draws a large number of polyester filaments 212 into the vacuum venturi tube 226. Polyester pellets 204 are supplied from a pellet container 202 to a feeder tube 206 that feeds the polyester pellets 204 into a heater and pump 208. The heater melts the polyester pellets 204 into a liquid, which is then pumped into spinneret 210. The spinneret has extrusion dies that extrudes the liquid polyester into the numerous polyester filaments 212. The polyester threads 220, 222, 224 are pulled through the vacuum venturi tube 228. Both the fiberglass threads and the polyester filaments are fed into a single disperser 230. The disperser 230 mixes and disperses the fiberglass threads 220, 222, 224 and the polyester filaments 212, and spreads the mixed fiberglass threads 220, 222, 224 and polyester filaments 212 onto a web forming belt 232 to create a mixed polyester and fiberglass web 234. The disperser 230 causes the fiberglass threads and the polyester filaments to be substantially evenly dispersed in the polyester and fiberglass web 234. In other words, both the fiberglass threads 220, 222, 224, as well as the polyester filaments 212, are spread by the disperser 230 across the width of the web forming belt 232, as the top of the web forming belt 232 moves in a direction to the right, as illustrated in FIG. 2. Of course, any number of fiberglass threads 220, 222, 224 can be utilized to increase the fire resistance of the non-woven polyester and fiberglass web 234. In addition, the fiberglass threads 220, 222, 224 can provide strength for the non-woven polyester and fiberglass web 234 in a lateral direction, which can resist shrinkage of the non-woven polyester and fiberglass web 234 during a high speed roofing assembly line. The number of fiberglass threads can be adjusted to vary the fire resistance of the polyester and fiberglass web and the malleability of the roofing material to balance the impact resistance of the roofing material, versus the fire resistance.

Figure 3:
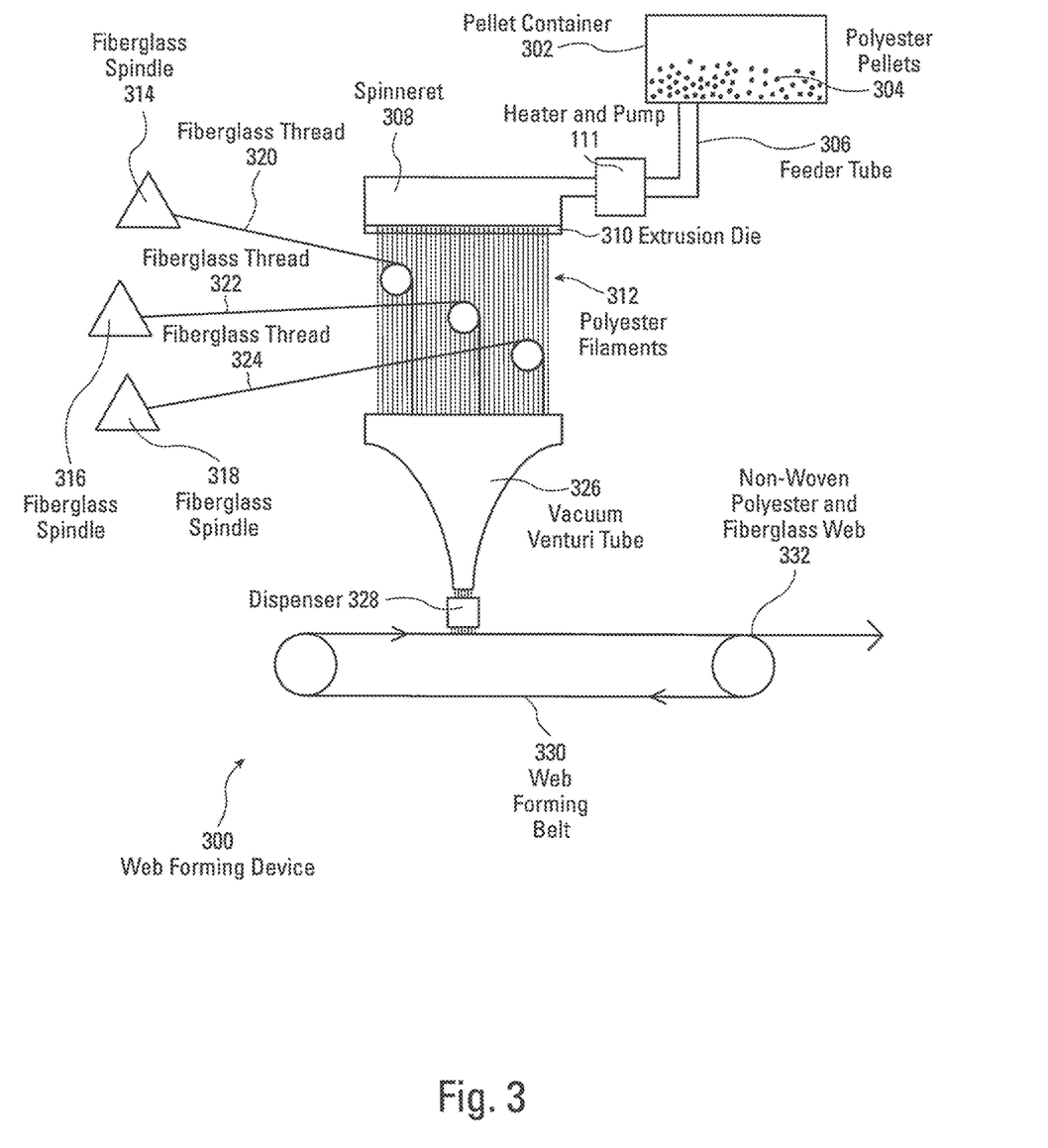
FIG. 3 illustrates a third embodiment of the present invention.

FIG. 3 illustrates another embodiment of a web forming device 300 for forming a non-woven polyester and fiberglass web 332. As illustrated in FIG. 3, fiberglass spindles 314, 316, 318 provide fiberglass threads 320, 322, 324, respectively. The fiberglass threads are directed into a vacuum venturi tube 326. As illustrated in FIG. 3, the fiberglass threads 320, 322, 324 can be evenly disposed across the opening of the vacuum venturi tube 326. By disposing the fiberglass threads 320, 322, 324 across the vacuum venturi tube 326, even disbursement occurs.

As also illustrated in FIG. 3, polyester filaments 312 are drawn into the vacuum venturi tube 326 from extrusion dies 310 that are located on the spinneret 308. Polyester pellets 304 are stored in a pellet container 302 and fed through a feeder tube 306 to a heater and pump 311, which melts the polyester pellets 304 to a liquid form. The pump 311 pumps the liquid polyester into the spinneret 308 for extrusion through the extrusion die 310. The fiberglass threads 320, 322, 324 and the polyester filaments 312 are drawn through the vacuum venturi tube 326 into the disperser 328. The disperser evenly distributes the fiberglass threads 320, 322, 324 and the polyester filaments 312 across the surface of the top portion of the web forming belt 330 to create the non-woven polyester and fiberglass web 332. As a result, the fiberglass thread and the polyester filaments are substantially evenly dispersed across the width of the top of the web forming belt 330, since both the fiberglass threads 320, 322, 324 and the polyester filaments 312 are fed through the same disperser 328. "The non-woven polyester and fiberglass web 332 are transported by the web forming belt 330 in the direction of the arrow illustrated in FIG. 3. Since the fiberglass threads 320, 322 and 324 are substantially evenly dispersed in the web forming belt 330, fire resistance from the fiberglass threads 320, 322, 324 is provided throughout the non-woven and polyester and fiberglass web 332. Of course, any number of fiberglass threads 320, 322, 324 can be utilized to increase the fire resistance of the non-woven polyester and fiberglass web 332. In addition, the fiberglass threads 320, 322, 324 can provide strength for the non-woven polyester and fiberglass web 332 in a lateral direction, which can resist shrinkage of the non-woven polyester and fiberglass web 332 during a high speed roofing assembly line. The number of fiberglass threads can be adjusted to vary the fire resistance of the polyester and fiberglass web and the malleability of the roofing material to balance the impact resistance of the roofing material, versus the fire resistance.

Figure 4:
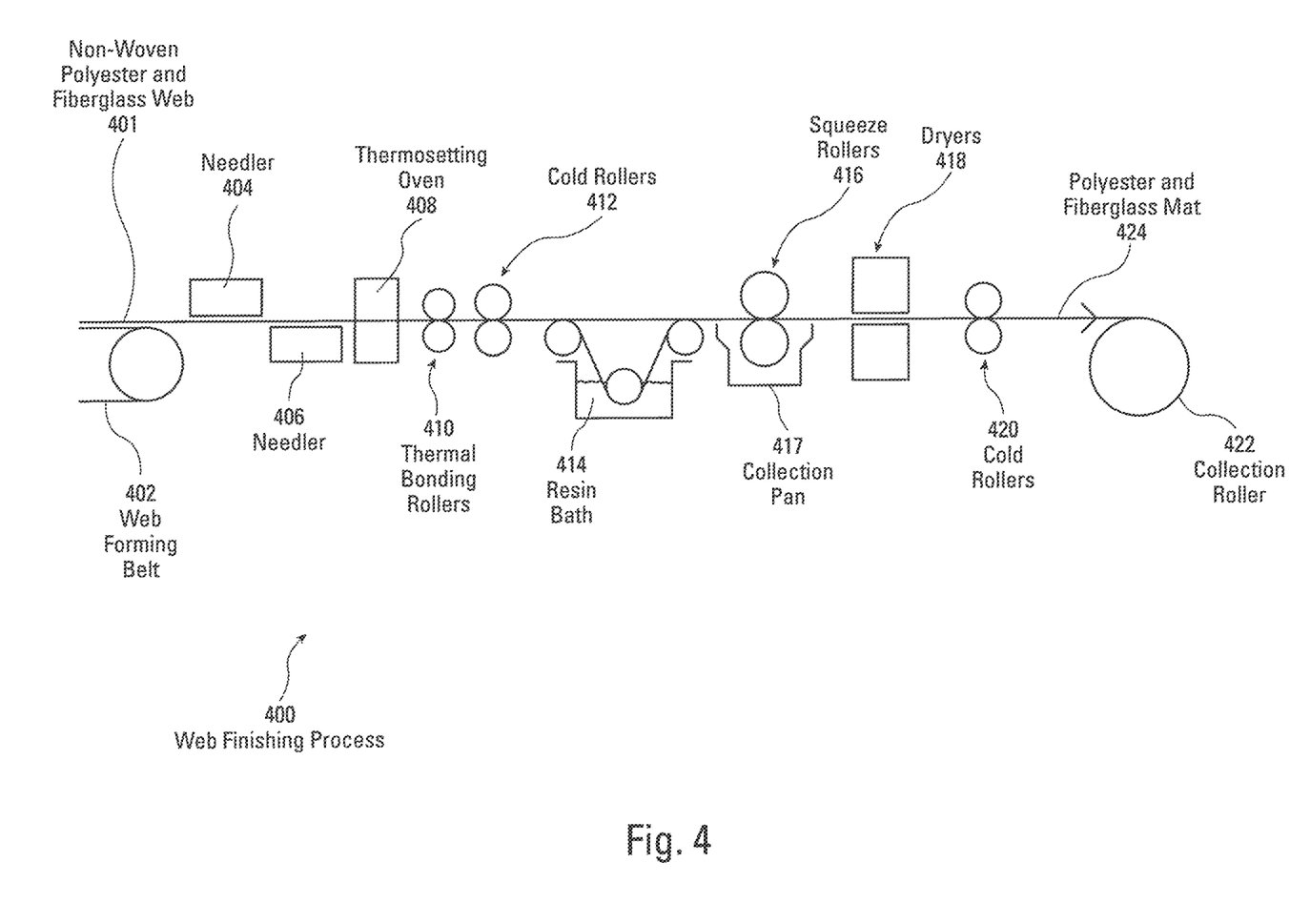
FIG. 4 illustrates an embodiment of a web finishing process that can be used with the embodiments of either FIGS. 1, 2 and 3.

FIG. 4 is a schematic illustration of one embodiment of a web finishing process 400. As illustrated in FIG. 4, a polyester and fiberglass web 401 is transported from the web forming belt 402 to the web finishing process 400. The web forming belt 402 may comprise any of the web forming belts of FIGS. 1, 2 and 3, and the non-woven polyester and fiberglass web 401 can comprise any of the non-woven polyester and fiberglass webs illustrated in FIGS. 1, 2 and 3. The non-woven polyester and fiberglass web 401 is transported to a first needler 404 that needles the polyester filaments and fiberglass threads from the top of the polyester and fiberglass web 401. Needler 406 needles the polyester filaments and fiberglass threads from a bottom portion of the polyester and fiberglass web 401. Needlers 404, 406 entangle the polyester filaments and fiberglass threads so as to lock the polyester filaments and fiberglass threads together. Other forms of entanglement can be used, such as hydro-entanglers. The entangled polyester and fiberglass web 401 then moves to a thermosetting oven 408. The thermosetting oven 408 increases the temperature of the entangled polyester and fiberglass web 401 to a bonding temperature for the polyester filaments. Thermal bonding rollers 410 then bond the polyester filaments and fiberglass threads, using both pressure and heat. The bonded web then proceeds to cold rollers 412, which cool the bonded web and reduces the temperature substantially. For example, the bonded web may be reduced to a temperature of approximately 40 degrees Fahrenheit. The bonded web is then sent through a resin bath 414 and submersed in a resin to further bond the web. Squeeze rollers 416 squeeze the excess resin, which is collected in the collection pan 417. Dryers 418 then dry the resin to create a polyester and fiberglass mat 424. Cold rollers 420 cool the polyester and fiberglass mat 424 prior to being collected on a collection roller 422.

The various embodiments of the present invention therefore provide a mixed polyester and fiberglass mat that can be modified to adjust the amount of fiberglass with respect to the amount of polyester to thereby modify the amount of impact resistance versus the amount of fire resistance of the polyester and fiberglass mat. The polyester and fiberglass mat can be constructed so that the fiberglass can be interspersed in the polyester filaments, as illustrated in FIGS. 2B and 3, or a separate fiberglass layer can be formed that is sandwiched between two polyester layers, as disclosed in FIGS. 1 and 2A. Each of these embodiments provides different advantages and benefits. Of course, any number of fiberglass and polyester layers can be formed in the same manner as disclosed herein. Additionally, the polyester and fiberglass web and resulting polyester and fiberglass mat are made from continuous fibers that are entangled. The fact that continuous fibers are used greatly increases the strength of both the web and the mat and provides for greater impact resistance of the resulting web and mat. Webs and mats that are constructed from short synthetic and mineral fibers do not provide the impact resistance and strength of the continuous synthetic and mineral fibers utilized in accordance with the present invention. In addition, some types of continuous organic fiber, such as lyocell, can also be used in place of the fiberglass threads.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of forming a fire resistant synthetic fiber and mineral fiber mat comprising:
heating a plastic to a liquid state to create liquid plastic;
extruding said liquid plastic through a first extruder to create a plurality of first continuous synthetic fiber filaments;
drawing said first continuous synthetic fiber filaments through a first vacuum venturi tube;
drawing a plurality of continuous mineral fiber threads through a second vacuum venturi tube;
randomly dispersing said plurality of continuous mineral fiber threads and said continuous synthetic fiber filaments so that said plurality of continuous mineral fiber threads and said continuous synthetic fiber filaments are mixed and dispersed across a web forming belt to thereby create said fire resistant synthetic fiber and mineral fiber mat.

2. The method of claim 1 wherein said plastic comprises polyester and said continuous synthetic fiber comprises continuous polyester filaments.

3. The method of claim 2 wherein said plurality of continuous mineral fiber threads comprises a plurality of continuous fiberglass threads.

4. The method of claim 3 further comprising:
entangling said continuous polyester filaments and said continuous fiberglass threads to form an entangled, combined polyester and fiberglass web;
bonding said entangled, combined polyester and fiberglass web to form a fire resistant polyester and fiberglass mat.

5. The method of claim 4 wherein said process of entangling comprises needling said continuous polyester filaments and said continuous fiberglass threads using a single needler.

6. The method of claim 4 wherein said process of entangling comprises needling said continuous polyester filaments and said continuous fiberglass threads using top and bottom needlers.

7. The method of claim 4 wherein said process of entangling comprises hydro-entanglement.

8. The method of claim 4 wherein said process of bonding comprises using thermal bonding.

9. The method of claim 4 wherein said process of bonding comprises resin bonding.

10. The method of claim 4 wherein said process of bonding comprises both thermal bonding and resin bonding.

11. The method of claim 3 further comprising;
entangling said continuous polyester filaments and said continuous fiberglass threads to form an entangled, combined polyester and fiberglass web;
bonding said entangled, combined polyester and fiberglass web to form a fire resistant synthetic fiber and fiberglass thread mat.

12. The method of claim 11 wherein said process of entangling comprises needling said continuous polyester filaments, and said continuous fiberglass threads using a single needler.

13. The method of claim 11 wherein said process of entangling comprises needling said continuous polyester filaments and said continuous fiberglass threads using top and bottom needlers.

14. The method of claim 11 wherein said entangling comprises hydro-entanglement.

15. The method of claim 11 wherein said process of bonding comprises using thermal bonding.

16. The method of claim 11 wherein said process of bonding comprises resin bonding.

17. The method of claim 11 wherein said process of bonding comprises both thermal bonding and resin bonding.

18. A method of forming a combined, fire resistant, synthetic fiber and mineral fiber mat comprising:
heating a synthetic polymer to a liquid state to create a liquid synthetic polymer;
extruding said liquid synthetic polymer through a first extruder to create a plurality of first polymer fiber filaments;
drawing said polymer filaments through a vacuum venturi tube;
supplying said polymer filaments and a plurality of mineral fiber threads to a disperser that disperses and mixes said polymer filaments and said plurality of mineral fiber threads in a random order to create said combined, fire resistant, synthetic fiber and mineral fiber mat.

19. The method of claim 18 wherein said synthetic polymer is polyester and said polymer filaments are polyester filaments.

20. The method of claim 19 wherein said mineral fiber is fiberglass.

21. The method of claim 20 further comprising:
entangling said polyester filaments, said fiberglass thread to form an entangled polyester and fiberglass web;
bonding said entangled polyester and fiberglass web to form a polyester and fiberglass mat.

22. The method of claim 21 wherein said process of entangling comprises needling said polyester filaments and said fiberglass thread using a needler.

23. The method of claim 21 wherein said process of entangling comprises needling said polyester filaments and said fiberglass thread using top and bottom needlers.

24. The method of claim 21 wherein said process of entangling comprises hydro-entanglement.

25. The method of claim 21 wherein said process of bonding comprises using thermal bonding.

26. The method of claim 21 wherein said process of bonding comprises resin bonding.

27. The method of claim 21 wherein said process of bonding comprises both thermal bonding and resin bonding.

28. A method of forming a combined synthetic fiber and mineral fiber mat that is fire resistant comprising:
generating continuous synthetic fiber filaments;
generating a plurality of continuous mineral fiber threads;
dispersing said continuous synthetic fiber filaments and said plurality of continuous mineral fiber threads which creates a mixture of said continuous synthetic fiber filaments and said plurality of continuous mineral fiber threads on a web forming belt;
entangling said mixture of continuous synthetic fiber filaments and said plurality of continuous mineral fiber threads to create an entangled mixed web of said continuous synthetic fiber filaments and said plurality of continuous mineral fiber threads;
bonding said entangled mixed web of said continuous synthetic fiber filaments and said plurality of continuous mineral fiber threads to form said combined synthetic fiber and mineral fiber mat.

29. The method of claim 28 wherein said continuous synthetic fiber filaments polyester filaments to create continuous polyester filaments.

30. The method of claim 29 wherein said plurality of continuous mineral fiber threads comprise a plurality of continuous fiberglass threads.

31. The method of claim 30 wherein said process of entangling comprises needling said continuous polyester filaments and said plurality of continuous fiberglass threads using a single needler.

32. The method of claim 30 wherein said process of entangling comprises needling said continuous polyester filaments and said plurality of continuous fiberglass threads using top and bottom needlers.

33. The method of claim 31 wherein said entangling comprises hydro-entanglement.

34. The method of claim 30 wherein said process of bonding comprises using thermal bonding.

35. The method of claim 30 wherein said process of bonding comprises resin bonding.

36. The method of claim 30 wherein said process of bonding comprises both thermal bonding and resin bonding.

37. A method of forming a fire resistant mat using entangled, continuous synthetic polymer filaments and continuous mineral fiber threads comprising:

supplying said continuous synthetic polymer filaments and said continuous mineral fiber threads to a disperser that randomly disperses said continuous synthetic polymer filaments and said continuous mineral fiber threads so that said continuous synthetic polymer filaments and said continuous mineral fiber threads are mixed to form a web of continuous synthetic polymer filaments and continuous mineral fiber threads;

entangling said web of continuous synthetic polymer filaments and said continuous mineral fiber threads to form an entangled synthetic polymer filament and mineral fiber thread layer;

bonding said entangled synthetic polymer filaments and mineral fiber threads to create said fire resistant mat.

38. The method of claim 37 wherein said synthetic polymer filaments are polyester.

39. The method of claim 38 wherein said mineral fiber threads are fiberglass threads.

40. The method of claim 39 wherein said process of entangling comprises needling said synthetic polymer filaments and said fiberglass threads using a needler.

41. The method of claim 39 wherein said process of entangling comprises hydro-entanglement.

42. The method of claim 39 wherein said process of bonding comprises using thermal bonding.

43. The method of claim 39 wherein said process of bonding comprises resin bonding.

* * * * *